July 28, 1925.
G. A. WOODHEAD
LAMINATED SPRING
Filed Nov. 14, 1924
1,547,405
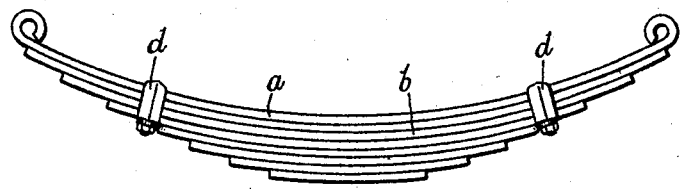
Fig: 1.
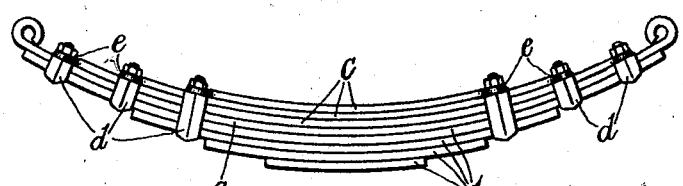
Fig: 2.
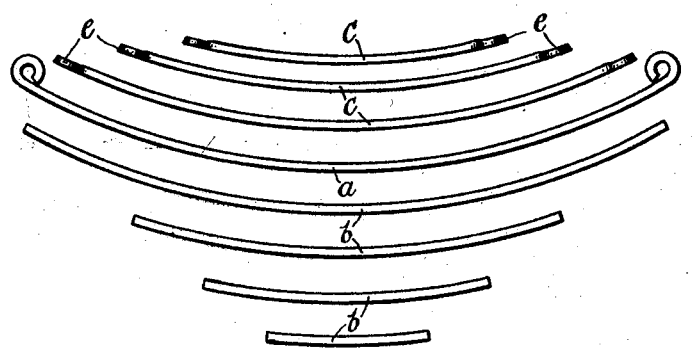
Fig: 3.
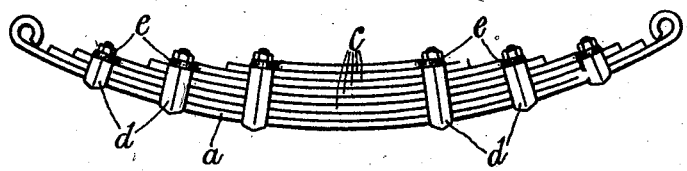
Fig: 4.
Inventor
George Alfred Woodhead
Per. J. Fletcher Wilson
Attorney.

Patented July 28, 1925.

1,547,405

UNITED STATES PATENT OFFICE.

GEORGE ALFRED WOODHEAD, OF LEEDS, ENGLAND.

LAMINATED SPRING.

Application filed November 14, 1924. Serial No. 749,896.

*To all whom it may concern:*

Be it known that I, GEORGE ALFRED WOODHEAD, a subject of the King of Great Britain, residing at The Grange, Old Park Road, Roundhay, Leeds, England, have invented certain new and useful Improvements in or Relating to Laminated Springs, of which the following is a specification.

This invention has reference to laminated springs for use more particularly on motor driven vehicles although the invention is not confined exclusively to this type of laminated spring.

Where, as in automobiles particularly, laminated springs are constantly subject to shocks of a more or less severe order some means is desirable for checking the tendency to rebound or bounce consequent on the sudden removal of the load.

Apart from the bad effect on the suspension system generally this tendency to rebound or bounce is largely responsible for spring failures, and also for skidding by reason of the vehicle not holding to the road as it should do.

This inherent defect of the present type of laminated spring has in fact given rise to the common practice on road vehicles of fitting special shock absorbing devices having for their exclusive object to counteract the injurious effect of the rebound of the main springs.

The object of the present invention is to construct the main springs themselves in such a manner as to eliminate, or at least very much reduce, the rebound tendency and so as to render the fitting of auxiliary shock absorbing devices quite unnecessary.

Rebound plates superimposed upon the main leaf and opposed to the series of plates constituting the spring proper have been employed to check the rebound tendency but with indifferent success in many instances because unless fitted with considerable "nip" their free ends tend to separate from the main spring and from each other at the identical moment in the movement of the spring when their close co-operation with the latter is essential to check rebound.

Where rebound plates are fitted with "nip", as when they are made flat or of opposite camber to that of the main spring a permanent initial stress is necessarily set up both in the rebound plate or plates and to a more or less extent, in the main spring itself.

According to this invention the rebound plate or plates is or are so arranged with respect to the main spring that they form at all times an integral part of the weight-carrying system of the latter, that is to say, they are made of the same camber as that of the main leaf and positively secured to the main spring at or near their free ends. An important advantage accruing from this formation of the rebound plate or plates is that when the spring is assembled no initial stresses are set up either in the rebound plates or, taken as a whole, in the main spring itself.

A further noteworthy feature of the invention apart from the reduction or elimination of bounce or rebound is that for a given load the improved spring need not contain any more steel than a spring of ordinary design so that the present invention is further characterized in that there need be no increase of weight.

As already stated the rebound plates are positively secured to the main spring and consequently bear their share of the load and one of the most efficient ways of accomplishing this end, which also checks lateral movement of all the plates both rebound and ordinary, is to employ an arrangement in which each or certain of the superimposed rebound plates is or are formed at their ends with solid lugs to receive clips which embrace the leaves opposed thereto on the normal side of the main leaf, or vice versa, that is to say, the lugs may be formed solid with some of the leaves of the ordinary spring, the clips embracing the rebound plates. It is not however proposed to confine the present invention to the use of this particular form of clip since any device that will maintain the various plates of the improved spring at all times in close contact with each other and prevent lateral displacement of the same will be found to answer the purpose of the invention.

In order that the invention may be clearly understood and readily carried into practical effect reference is made in further describing the same to the accompanying drawing, wherein, Figure 1 shews by way of contrast or comparison a laminated spring of the ordinary conventional type.

Figure 2 represents one example of a spring constructed in accordance with this invention.

Figure 3 shews the plates or leaves of the spring shewn in Figure 2 separated.

Figure 4 represents a spring in which the application of the present invention is carried to its logically extreme point.

Throughout the drawing like parts are designated by similar reference characters.

Referring to the drawing, $a$ represents the usual top plate, back plate or main leaf, $b$ the ordinary plates and $c$ the rebound plates, whilst $d$ indicate the clips.

There may be one only or any desired number of rebound plates $c$ superimposed upon the main leaf or back plate $a$ but, whereas they have been hitherto fitted with "nip", they are formed according to the present invention so that in their normal unstressed state they will lie in close and uniform contact with the main leaf and with each other when the spring is assembled. In a cambered spring therefore each rebound plate, as seen in Figure 3, is of the same camber as that of the main leaf and consequently no initial stress is set up either in the rebound plates or, taken as a whole, in the main spring itself when the spring is made up.

The spring shewn in Figure 2 is by way of example only and serves to illustrate two points, firstly that there may be as many rebound plates as there are plates on the normal side of the main leaf and secondly, that the total number of plates and therefore the weight of the improved spring need not exceed that of an ordinary spring, Figure 1, for the same service.

Whilst as already stated there may be any desired number of rebound plates there need not necessarily be any plates whatever on the normal side of the main leaf, as is represented in Figure 4, and it is to be observed that in a spring built up in this way with equally cambered plates, there is an entire absence of initial stress, the whole of the material comprising the spring being technically at rest when the latter is not under load.

The clips $d$ as shewn are of U-shaped with reduced and screw threaded free ends which are passed through and secured by nuts to perforated lugs $e$ formed integrally with and projecting laterally from the ends of each of the rebound plates $c$. Obviously this arrangement can be reversed and the free ends of the clips passed through and secured by nuts to lugs on the ends of the leaves of the main spring. In either case the effect is to make the rebound plates an integral part of the spring and to prevent lateral displacement of any of the plates or leaves.

I claim:—

1. A laminated spring comprising a main plate, a rebound plate made to lie without stress in uniform contact therewith and means for securing the two plates together without interfering with their relative freedom of action when under a varying load.

2. A laminated spring comprising a main plate, a plurality of rebound plates of graduated lengths made to lie without stress in uniform contact therewith and with each other and means for securing the various plates together without interfering with their relative freedom of action when under a varying load.

3. A laminated spring comprising a main plate, a rebound plate made to lie without stress in uniform contact therewith, a supplementary plate on the opposite side of the main plate and means for securing the three plates together without interfering with their relative freedom of action when under a varying load.

4. A laminated spring comprising a main plate, a plurality of rebound plates of graduated lengths made to lie without stress in uniform contact therewith and with each other, a supplementary plate on the opposite side of the main plate and means for securing the plates together without interfering with their relative freedom of action when under a varying load.

5. A laminated spring comprising a main plate, a rebound plate made to lie without stress in uniform contact therewith, a plurality of supplementary plates of graduated lengths at the opposite side of the main plate and means for securing the plates together without interfering with their relative freedom of action when under a varying load.

6. A laminated spring comprising a main plate, a plurality of rebound plates of graduated lengths superimposed thereon and made to lie without stress in uniform contact with each other and with the main plate, and a plurality of supplementary plates of graduated lengths on the opposite side of the main plate and means for securing the plates together without interfering with their relative freedom of action when under a varying load.

7. A laminated spring comprising a main plate, a rebound plate having laterally projecting perforated lugs at each end and made to lie without stress in uniform contact with the main plate and a pair of clips each adapted to embrace said plates and to be secured to said lugs.

8. A laminated spring comprising a main plate, a plurality of rebound plates of graduated lengths made to lie without stress in uniform contact with each other and with the main plate and having perforated laterally projecting lugs at their ends and a plurality of clips each embracing a more or less number of the plates and adapted for several attachment to said lugs.

9. A laminated spring comprising a main plate, a rebound plate having laterally projecting perforated lugs at each end and made to lie without stress in uniform contact with the main plate, a supplementary plate on the opposite side of the main plate and a pair of clips embracing the three plates and adapted for attachment to said lugs.

10. A laminated spring comprising a main plate, a plurality of rebound plates of graduated lengths made to lie without stress in uniform contact with each other and with the main plate and having perforated laterally projecting lugs at their ends, a supplementary plate on the opposite side of the main plate and a plurality of clips each embracing a more or less number of the plates and adapted for several attachment to said lugs.

11. A laminated spring comprising a main plate, a plurality of rebound plates of graduated lengths made to lie without stress in uniform contact with each other and with the main plate and having perforated lugs projecting laterally from their ends, a plurality of supplementary plates of graduated lengths on the opposite side of the main plate and a plurality of clips adapted for several attachment to said lugs and embracing a more or less number of all the plates.

GEORGE ALFRED WOODHEAD.